United States Patent
Aliakseyeu et al.

(10) Patent No.: US 9,730,293 B2
(45) Date of Patent: Aug. 8, 2017

(54) METHOD AND APPARATUS FOR CONVEYING AGGREGATE PRESENCE INFORMATION USING LIGHT

(71) Applicant: PHILIPS LIGHTING HOLDING B.V., Eindhoven (NL)

(72) Inventors: Dzmitry Viktorovich Aliakseyeu, Eindhoven (NL); Tim Dekker, Eindhoven (NL); Bartel Marinus Van de Sluis, Eindhoven (NL); Philip Steven Newton, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/899,784

(22) PCT Filed: Jun. 12, 2014

(86) PCT No.: PCT/IB2014/062151
§ 371 (c)(1),
(2) Date: Dec. 18, 2015

(87) PCT Pub. No.: WO2015/001435
PCT Pub. Date: Jan. 8, 2015

(65) Prior Publication Data
US 2016/0143111 A1    May 19, 2016

Related U.S. Application Data

(60) Provisional application No. 61/841,969, filed on Jul. 2, 2013.

(51) Int. Cl.
*H05B 33/00* (2006.01)
*H05B 33/08* (2006.01)
*H05B 37/02* (2006.01)

(52) U.S. Cl.
CPC ..... *H05B 33/0872* (2013.01); *H05B 33/0863* (2013.01); *H05B 37/0227* (2013.01); *H05B 37/0245* (2013.01)

(58) Field of Classification Search
CPC ............ H05B 37/0227; H05B 37/0236; H05B 37/0281; H05B 37/029; H05B 33/0803;
(Continued)

(56) References Cited

U.S. PATENT DOCUMENTS

2007/0146126 A1  6/2007  Wang
2007/0215794 A1  9/2007  Cernasov et al.
(Continued)

FOREIGN PATENT DOCUMENTS

WO    2009133505 A1    11/2009
WO    2010116289 A1    10/2010
(Continued)

*Primary Examiner* — Monica C King
(74) *Attorney, Agent, or Firm* — Meenakshy Chakravorty

(57) ABSTRACT

The present disclosure is directed generally to lighting control, and more particularly, to various inventive methods, systems, computer-readable media (transitory and non-transitory) and apparatus for conveying aggregate presence information using light. For example, in some embodiments, output of a presence sensor over time may be aggregated, and an LED node may cause one or more LEDs to emit light having a property that conveys the aggregated captured output.

19 Claims, 4 Drawing Sheets

(58) Field of Classification Search
CPC ............ H05B 33/0845; H05B 33/0848; H05B 33/0854; H05B 33/0857; H05B 33/0863; H05B 33/089; H05B 37/0245; H05B 37/0254
See application file for complete search history.

(56) References Cited

U.S. PATENT DOCUMENTS

| | | |
|---|---|---|
| 2008/0265799 A1 | 10/2008 | Sibert |
| 2010/0106306 A1 | 4/2010 | Simon et al. |
| 2010/0327766 A1* | 12/2010 | Recker .................... H02J 9/02 315/291 |
| 2011/0133655 A1 | 6/2011 | Recker et al. |
| 2011/0175551 A1 | 7/2011 | Wood et al. |
| 2012/0001766 A1 | 1/2012 | Bialoskorski et al. |

FOREIGN PATENT DOCUMENTS

| | | |
|---|---|---|
| WO | 2011151754 A1 | 12/2011 |
| WO | 2012137046 A1 | 10/2012 |
| WO | 2012160467 A1 | 11/2012 |

* cited by examiner

METHOD AND APPARATUS FOR CONVEYING AGGREGATE PRESENCE INFORMATION USING LIGHT

CROSS-REFERENCE TO PRIOR APPLICATIONS

This application is the U.S. National Phase application under 35 U.S.C. §371 of International Application No. PCT/IB2014/062151, filed on Jun. 12, 2014, which claims the benefit of U.S. Provisional Patent Application No. 61/841,969, filed on Jul. 2, 2013. These applications are hereby incorporated by reference herein.

TECHNICAL FIELD

The present invention is directed generally to lighting control. More particularly, various inventive methods and apparatus disclosed herein relate to conveying aggregate presence information using light.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different hues, e.g. red, green, and blue, as well as a processor for independently controlling the output of the LEDs in order to generate a variety of colors and color-changing lighting effects.

LED lighting fixtures increasingly are being networked together, e.g., using communication technologies such as ZigBee, coded light, WiFi and so forth. In many cases, they may be paired with presence or light-level sensors to be used for applications such as data collection and lighting control. Some presence and light-level sensors are capable of network communication, e.g., using KNX (EN 50090, ISO/IEC 14543) or a data addressing lighting interface (DALI, IEC 60929). However, the benefits gained from many of these applications may not justify the investment required for networked lighting. For instance, a shop owner might wish to know how many people passed a particular area of her shop or picked up a particular product from shelves. While this information may be useful, it may not be useful enough or valuable enough to motivate the shop owner to perform a complete store refurbishment. Accordingly, a more inexpensive solution is desirable.

Moreover, if a networked presence sensor were coupled with every LED light fixture in a busy store, the amount of information produced from sensing a large number of shoppers might be overwhelming, and would make data collection and mining complex. Accordingly, a simpler, more decentralized solution is desirable.

Thus, there is a need in the art to provide methods, systems, computer-readable media and apparatus that enable control of presence sensing and/or one or more properties of light output, and that optionally overcome one or more drawbacks of existing apparatus and/or methods.

SUMMARY

The present invention is directed generally to lighting control. More particularly, various inventive methods and apparatus disclosed herein relate to providing aggregate presence information using light. For example, in some embodiments, output of a presence sensor over time may be aggregated, and an LED node may cause one or more LEDs to emit light having a property that conveys the aggregated captured output.

Generally, in one aspect, a lighting control apparatus may include a presence sensor to sense a presence of an object and to provide responsive output. The lighting control apparatus may also include an aggregator module to generate an aggregate presence value based on output of the presence sensor captured over a period of time. The lighting control apparatus may further include an output module to generate lighting instructions based on the aggregate presence value. The lighting instructions may be configured to cause one or more LEDs to be illuminated in a manner that conveys the aggregate presence value.

In various embodiments, the output module may generate the lighting instructions to be configured to cause the one or more LEDs to emit a coded light signal that carries information indicative of the aggregate presence value. In various versions, the coded light signal may further carry a timestamp.

In various embodiments, the output module may generate the lighting instructions to be configured to cause the one or more LEDs to emit light with a visible lighting property representative of the aggregate presence value. In various versions, the visible lighting property may include a saturation, hue, brightness, pattern (temporal or spatial), etc., representative of the aggregate presence value.

In various embodiments, the aggregator module may include a capacitor that is charged while the presence sensor senses an object present. A charge of the capacitor at a given time may be representative of the aggregate presence value at that time. In various versions, the aggregator module may include a first RC circuit that controls a rate at which the capacitor is charged. In various versions, one or more resistors in the first RC circuit are adjustable to alter a charge rate of the capacitor. In various versions, the capacitor may be discharged while the presence sensor does not sense an object present. In various versions, the aggregator module may include a second RC circuit that controls a rate at which the capacitor is discharged.

In various embodiments, the lighting control apparatus may include a memory configured to store a counter. In various versions, the aggregator module may increment the counter based on the responsive output of the presence sensor.

In various embodiments, the lighting control apparatus may include a coded light sensor to receive coded light signals. In various versions, the output module may be further configured to generate the lighting instructions in response to an instruction carried by a coded light signal received at the coded light sensor. In various versions, the aggregator module may be further configured to reset the aggregate presence value in response to an instruction carried by a coded light signal received at the coded light sensor.

In various embodiments, the aggregator module may be configured to count two or more instances of responsive output of the presence sensor within a predetermined time interval as a single instance of responsive output for purposes of generation of the aggregate presence value. In various embodiments, the aggregator module may include a filter to limit an amount of responsive output of the presence sensor that is captured to generate the aggregate presence value.

In various embodiments, the output module may be configured to generate the lighting instructions just prior to the one or more LEDs being turned off.

In another aspect, light emitted from an LED node may be received, e.g., by a mobile computing device such as a smart phone. The emitted light may have a property that conveys an aggregate presence value aggregated by the LED node. Output indicative of the received aggregate presence value may be rendered by the mobile computing device on a display.

In various embodiments, the mobile computing device may generate an instruction configured to cause the LED node to emit the light with the property, and may transmit, to the LED node, a wireless signal carrying the instruction. In various versions, the wireless signal may include a coded light signal. In various versions, the property-to-be-emitted by the LED node includes a visible property (e.g., a hue, saturation, brightness, etc.) of the emitted light. In various versions, the property includes a coded light signal carried by the emitted light.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "LED node" as used herein refers to any apparatus such as a lighting fixture that includes one or more LEDs and a lighting control apparatus. The term "lighting control apparatus" refers to any apparatus that may be coupled with or installed into another apparatus such as a lighting fixture, e.g., to add features and/or grant the lighting fixture various additional capabilities, such as data collection and conveying of aggregate presence data using one or more properties of emitted light. For example, a lighting control apparatus may include a presence or light-level sensor configured to detect the presence of an object nearby or a light level.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting fixtures, such as LED-based lighting fixtures, increasingly are being networked together, and may be paired with presence or light-level sensors to be used for applications such as lighting control and data collection. Some presence and light-level sensors also are capable of network communication. However, the benefits gained from many of these applications may not be worth the investment required for networked lighting. Moreover, if a networked presence sensor were coupled with every LED node in a location, the amount of information produced from sensing myriad visitors might be overwhelming, making data collection/mining difficult.

Thus, Applicants have recognized and appreciated a need in the art to provide methods, systems, computer-readable media and apparatus that enable control of presence sensing and/or one or more properties of light output, and that optionally overcome one or more drawbacks of existing apparatus and/or methods.

Figure 1:
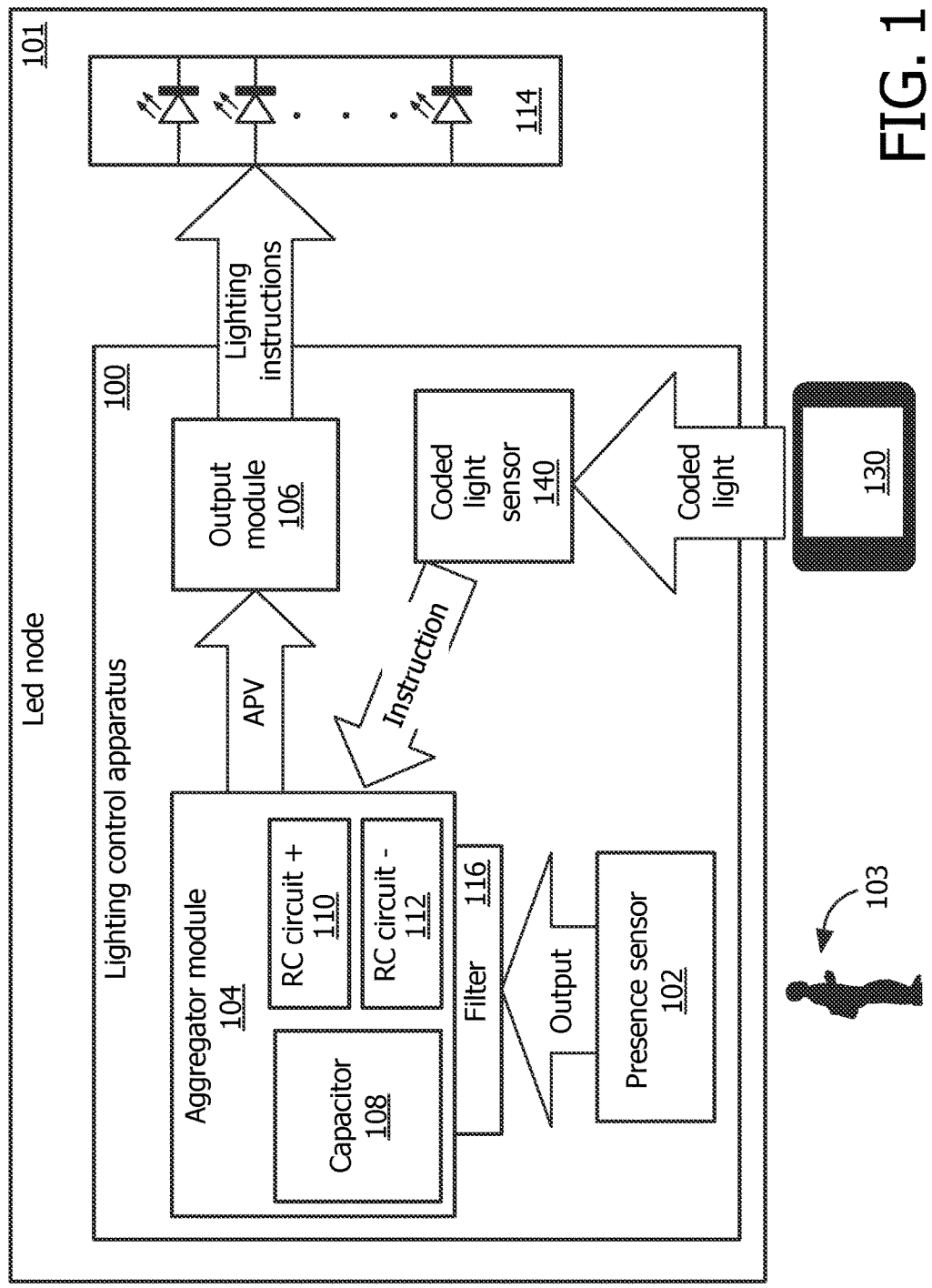
FIG. 1 schematically illustrates an example lighting control apparatus coupled with an LED lighting fixture to form an LED node, in accordance with various embodiments.

In view of the foregoing, various embodiments and implementations of the present invention are directed to lighting control. Referring to FIG. 1, in one embodiment, a lighting control apparatus 100 may include a presence sensor 102, an aggregator module 104 and an output module 106. In various embodiments, lighting control apparatus 100 may be a standalone component that may be coupled to or otherwise installed into an existing LED lighting fixture 107 to yield an LED node 101. For example, lighting control apparatus 100 may be used to retrofit existing lighting fixtures to grant them autonomous data collection and/or communication capabilities while avoiding the investment of networking those lighting fixtures together.

Presence sensor 102 may be any sensor configured to sense when an object such as a person (e.g., shopper 103 in FIG. 1), a vehicle, or something else is nearby. In some embodiments, presence sensor 102 may be a light sensor configured to detect the presence or absence of light. For example, presence sensor 102 may detect light reflected off a passing object, which may be more intense than a default amount of light it detects. As another non-limiting example, light sensor 102 may, by default, detect light emitted by, e.g., one or more LEDs or another light source such as the sun, a vehicle headlight or a chemical reaction. In such case, the absence of such light may indicate the presence of an object, e.g., where the object passes between light sensor 102 and the corresponding light source.

In various embodiments, aggregator module 104 may be configured to generate an aggregate presence value ("APV" in FIG. 1) based on output of presence sensor 102 captured over a period of time. The aggregate presence value may be generated in various ways. In embodiments where aggregator module 104 has access to any form of memory (e.g., a register, RAM, DRAM, flash, etc.), aggregator module 104 may increment a counter stored in that memory based on responsive output of presence sensor 102.

In other embodiments, such as the one depicted in FIG. 1, aggregator module 104 may include a capacitor 108 that is charged while presence sensor 102 senses an object present. Likewise, aggregator module 104 may discharge capacitor 108 while presence sensor 102 does not sense an object present. Accordingly, a charge of capacitor 108 at a given time may be representative of the aggregate presence value at that time. For example, the amount of charge on capacitor 108 may be an indication of a ratio of on/off times of presence sensor 102, which in turn may be a good proxy for a general level of activity near presence sensor 102.

Rates at which passing objects should be counted towards an aggregate presence value may be adjusted depending on the circumstances. For example, in a restaurant or museum, people usually move around in a slower pace than they might in a retail environment. Accordingly, aggregator module 104 may be configured to avoid "false positives," such as counting, as multiple shoppers, a single shopper repeatedly passing by presence sensor 102 numerous times in a short period of time.

In some embodiments, such as that depicted in FIG. 1, aggregator module 104 may include a first resistor-capacitor (RC) circuit 110 to control a rate at which capacitor 108 is charged, and a second RC circuit 112 to control a rate at which capacitor 108 is discharged. One or more resistors or capacitors of first RC circuit 110 and/or second RC circuit 112 may be adjusted, e.g., using one or more knobs or with a controlled lighting signal, to control a rate at which capacitor 108 is charged and/or discharged, respectively.

Additionally or alternatively, in various embodiments, aggregator module 104 may include one or more filters 105 to limit an amount of responsive output of presence sensor 102 that is captured to generate the aggregate presence value. For example, in some embodiments, one or more filters 105 may be employed to cause aggregator module 104 to count two or more instances of responsive output of presence sensor within a predetermined time interval as a single instance of responsive output for purposes of generation of the aggregate presence value. Similar to first RC circuit 110 and second RC circuit 112, one or more filters 105 may be adjustable to alter the amount of the responsive output of presence sensor 102 that is captured to generate the aggregate presence value.

In various embodiments, output module 106 may be configured to generate lighting instructions based on the aggregate presence value generated by aggregator module 104, as indicated by the arrow in FIG. 1. In various embodiments, the lighting instructions may be issued to one or more LEDs, e.g., in lighting fixture 107, to cause the one or more LEDs to be illuminated in a manner that conveys the aggregate presence value.

Figure 2:
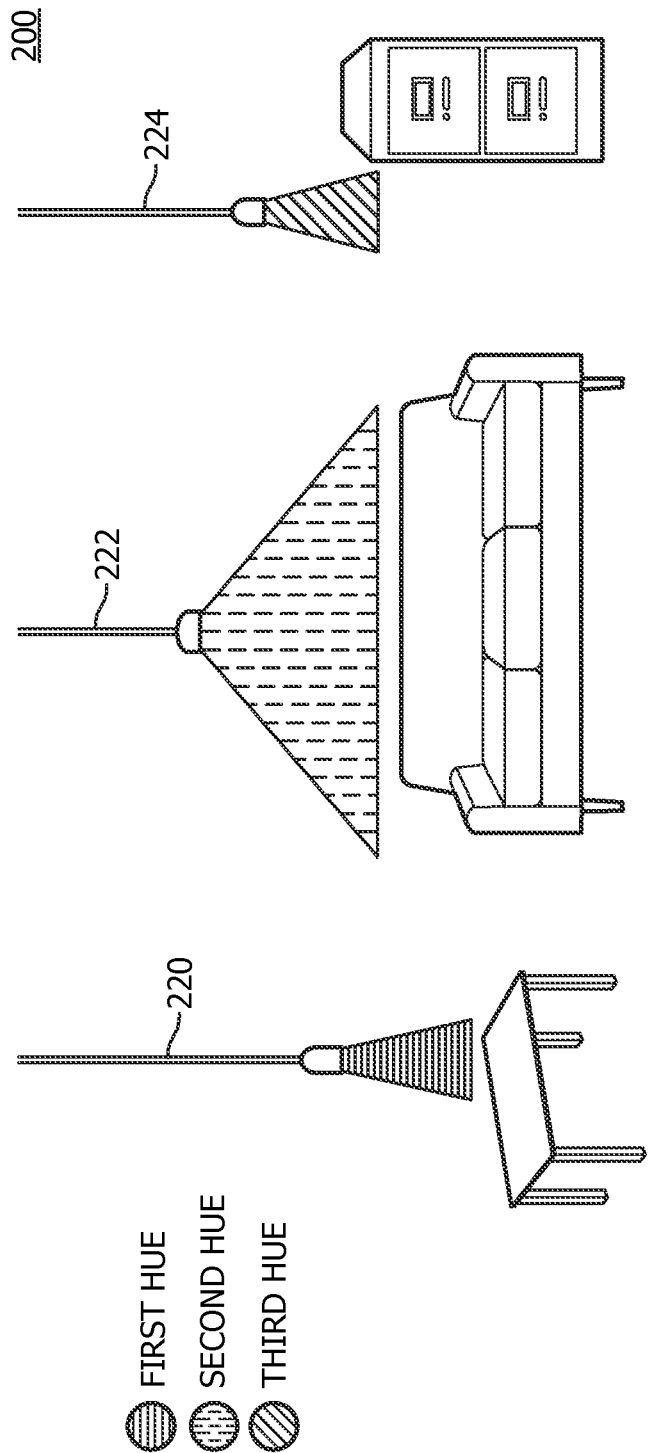
FIG. 2 schematically illustrates an example setting in which LED nodes are configured in accordance with various embodiments.

The one or more LEDs of lighting fixture 107 may be illuminated in various manners to convey the aggregate presence value. In some embodiments, output module 106 may generate the lighting instructions to be configured to cause the one or more LEDs to emit light with a visible lighting property (e.g., hue, saturation, brightness, temporal or spatial lighting pattern, etc.) representative of the aggregate presence value. FIG. 2 depicts a setting 200 in which a plurality of LED nodes configured in accordance with the present disclosure are deployed. A first LED node 220 near a table emits a first visible lighting property in the form of a first hue, a second LED node 222 above a couch emits a second hue, and a third LED node 224 near a cabinet emits a third hue. In this example, each hue may be indicative of a number of objects detected by that LED node during a time period.

In some embodiments, the hues emitted by the LED nodes may be based on various predefined thresholds. For example, it might be that in FIG. 2, if a number of objects sensed by a particular LED node is greater than or equal to a first threshold, the first hue may be emitted by that particular LED node. If the number of objects sensed is less than the first threshold but greater than a second threshold, then the second hue may be emitted. If the number of objects sensed is less than or equal to the second threshold, then the third hue may be emitted. Assuming this is the case in FIG. 2, traffic was heaviest by the table, the lightest by the cabinet, and somewhere in between on the couch. More or less thresholds may be used in various embodiments depending on, among other things, how many LED nodes there are in a given setting.

In other embodiments, LED nodes may be configured to emit a whole spectrum of hues, not just a few discrete hues.

The hue emitted by a LED node may occupy a position in a spectrum that corresponds to particular aggregate presence count (e.g., as more objects are sensed, red levels of light emitted by the LED node are gradually increased, and green levels are gradually decreased). Further, in some embodiments, in addition to or instead of hue, LED nodes may be configured to emit light having a particular saturation level or a brightness to convey an aggregate presence value generated by that LED node.

In addition to or instead of hue, saturation, or brightness, in some embodiments, output module 108 may generate the lighting instructions to be configured to cause one or more LEDs of lighting fixture 107 to emit a property not visible to humans. For example, one or more LEDs of lighting fixture 107 may be caused to emit a coded light signal that carries information indicative of the aggregate presence value, as well as other information such as a timestamp. An example of this is seen in FIG. 3, in which the same setting 200 as was depicted in FIG. 2 is shown again.

Figure 3:
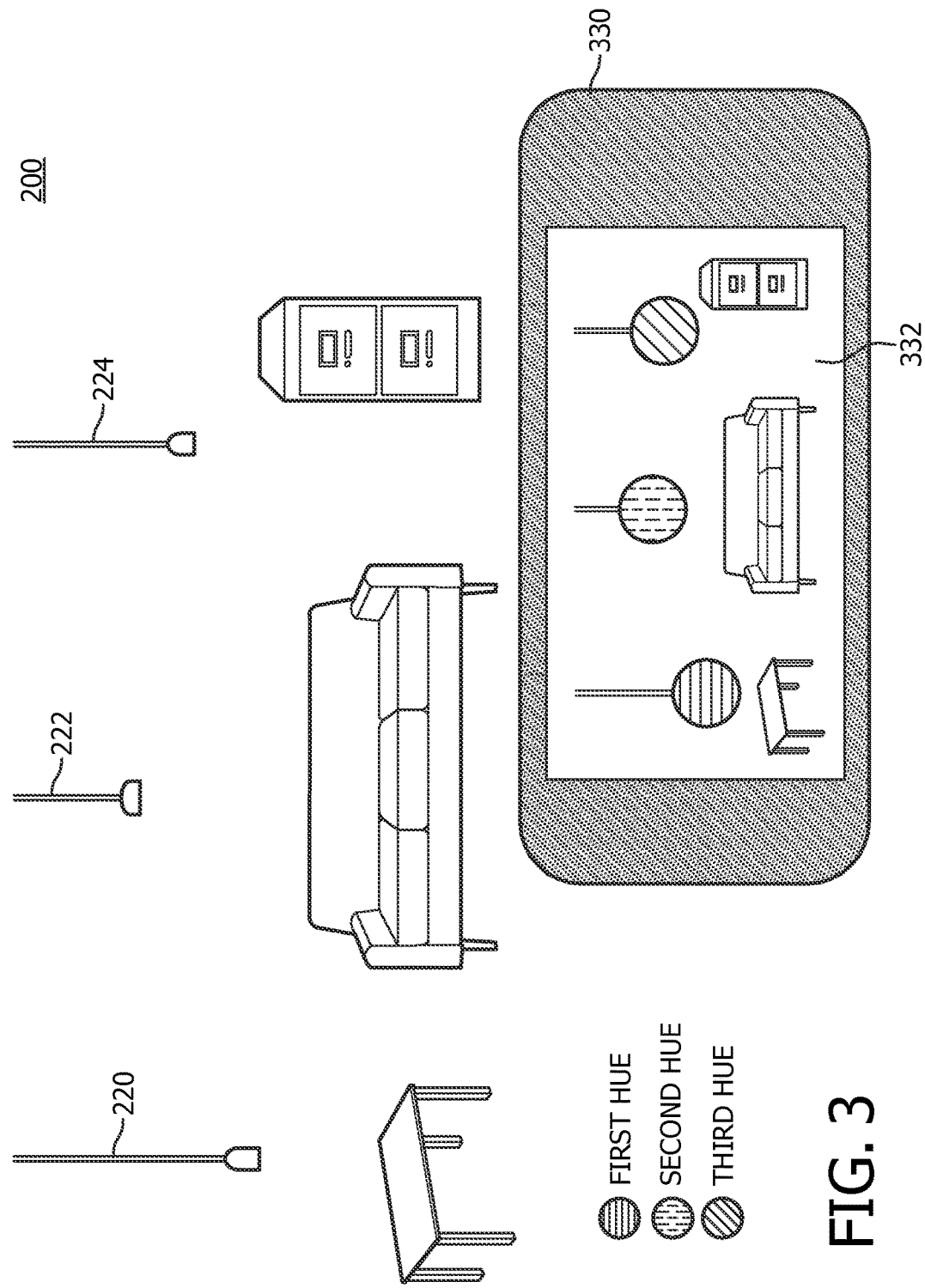
FIG. 3 illustrates the example setting of FIG. 2 as may be viewed using a mobile computing device, in accordance with various embodiments.

In FIG. 3, rather than emitting human-visible light with hues representing aggregate presence values, the LED nodes (220, 222, 224) may emit coded light signals. As coded light signals may not be decipherable by, and in some cases not even visible to, human beings, it may be necessary to read the coded light signals with a computing device such a tablet computer or a smart phone 330. In this example, smart phone 330 may capture visual data with a light sensor (not shown, e.g., a built-in camera), and render that data on a display 332. To this end, smart phone 330 may be configured to detect multiple coded light signals, e.g., that correspond with multiple LED nodes in a room. Smart phone 330 may also be configured to detect an approximate direction from which each coded light signal is received, to enable smart phone 330 to localize the received coded light signals and align display 332 with a view of the one or more LED nodes.

In various embodiments, smart phone 330 may render graphics to convey the aggregate presence values sensed by various LED nodes. For example, in FIG. 3, smart phone 330 is depicted rendering graphical indicators overlaying the LED nodes on display 332. In FIG. 3, the overlaid graphical indicators are the same three hues as in FIG. 2, but this is not required, and any hues could be used to convey an aggregate presence value generated by an LED node. Other types of graphics may be rendered as well, overlaying the LED nodes or otherwise. For example, a simple report of aggregated presence value (e.g., "TIME MONITORED: 5 MINUTES; SHOPPERS DETECTED: 14") could be presented on display 332, e.g., by itself or overlaying the corresponding LED node.

In addition to one-way communications conveying information regarding an aggregate presence value using emitted light, in some embodiments, lighting control apparatus 100 may be configured for two-way communication. For example, and referring back to FIG. 1, lighting control apparatus 100 may include a coded light sensor 140 configured to receive coded light signals. Coded light sensor 140 may receive coded light signals from various sources, such as other LED nodes or a mobile computing device 130 depicted in FIG. 1 (which could be a smart phone, tablet computer, or other mobile computing device).

Lighting control apparatus 100 may be configured to perform various operations in response to instructions carried by coded light signals sensed by coded light sensor 140. For example, in some embodiments, a coded light signal may carry an instruction configured to cause output module 106 to generate the lighting instructions. In some embodiments, a coded light signal may carry an instruction configured to cause LED node 101 to switch on, switch off, reset the aggregate presence value (e.g., by completely discharging capacitor 108 or resetting a counter to zero), and so forth.

In some cases, mobile devices may be configured to issue such instructions to lighting control apparatus 100. For instance, a smart phone (e.g., 130, 330) may generate an instruction configured to cause an LED node (e.g., 102, 220, 222, 224) to emit light with a property that conveys an aggregate presence value generated by lighting control apparatus 100. For example, the smart phone (130, 330) may include a wireless interface (not shown), such as a Bluetooth, WiFi, or even a coded light interface. The smart phone may transmit, to the LED node over its wireless interface, a wireless signal carrying the instruction. In various embodiments, the wireless signal may be in the form of a coded light signal.

Figure 4:
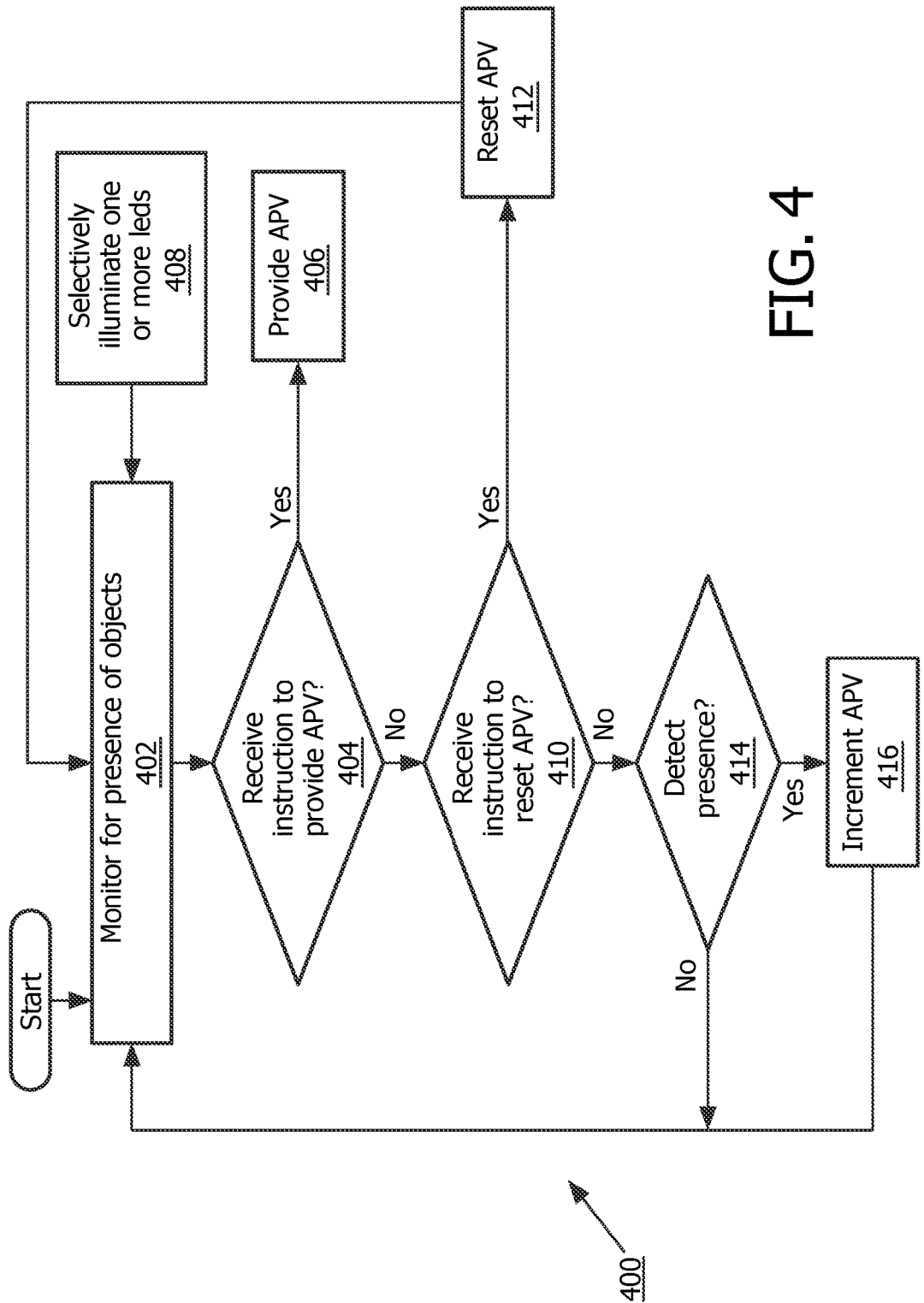
FIG. 4 depicts an example method that may be implemented to convey aggregate presence information using one or more properties of emitted light, in accordance with various embodiments.

FIG. 4 depicts an example method 400 that may be implemented by an LED node (e.g., 101) equipped with a lighting control apparatus such as lighting control apparatus 100 of FIG. 1. At block 402, lighting control apparatus 100 may monitor for presence of one or more objects, e.g., using presence sensor 102. In various embodiments, this monitoring may be in response to an LED node 101 being turned on. In other embodiments, the monitoring at block 402 may be in response to an instruction carried in a coded light signal and received by coded light sensor 140.

At block 404, it may be determined whether an instruction has been received, e.g., via a coded light signal received at coded light sensor 140, to provide an aggregate presence value (designated "APV" in FIG. 4). If the answer is yes, then at block 406, the aggregate presence value may be provided, e.g., by aggregator module 104 to output module 106. As noted above, in various embodiments, aggregator module 104 may provide a value that corresponds to a cumulative charge on capacitor 108 and/or an incremental counter stored in memory.

In other embodiments, rather than providing the aggregate presence value in response to an instruction, it may be provided automatically. For example, the aggregate presence value may be provided periodically, e.g., every five minutes, every hour, at the end of happy hour each day, etc. In some embodiments, the aggregate presence value may be provided just prior to an LED node being turned off. This may occur automatically or in response to user instruction at various times, such as at the end of business hours, and so forth. For example, when it comes time for an LED node to switch off, output module 106 may first generate the lighting instructions to cause one or more LEDs to be selectively illuminated in a manner that conveys the aggregate presence value, and only then may the LED node power down.

At block 408, output module 106 may selectively illuminate one or more LEDs, such as those in lighting fixture 107, to convey the aggregate presence value. As noted above, the aggregate presence value may be conveyed using various properties of light emitted from the one or more LEDs, including but not limited to a hue or saturation of the emitted light, or a coded light signal encoded into the emitted light. Method 400 may then proceed back to block 402.

Back at block 404, if the answer is no, then it may be determined at block 410 whether an instruction to reset the aggregate presence value has been received, e.g., via a coded light signal received at coded light sensor 140. If the answer is yes, then at block 412, the aggregate presence value may be reset (e.g., capacitor 108 entirely discharged, counter in memory set to zero), e.g., by aggregator module 104, and method 400 may proceed back to 402. In some embodiments, the aggregate presence value may be reset at other times, such as periodically (e.g., every 8 hours) or when an LED node is shut off.

If the answer at block 410 is no, then at block 414, it may be determined whether an object was sensed, e.g., by presence sensor 102. If the answer is no, then method 400 may simply proceed back to block 402. However, if the answer at block 414 is yes, then at block 416, the aggregate presence value may be incremented. For example, capacitor 108 may be charged while the object's presence is sensed by presence sensor 102, or a counter stored in memory may be incremented. Method 400 may then proceed back to block 402.

Although embodiments described herein have referred primarily to LED lights, this is not meant to be limiting. Disclosed techniques could be employed in other types of lighting fixtures. Moreover, while presence sensors are mentioned throughout, this also is not meant to be limiting. For example, light-level sensors may also be employed, so that light levels (e.g., LUX) at a particular point in time, or aggregated light levels over a period of time, may be conveyed by a property of a light source, e.g., at blocks 406-408 of FIG. 4.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An LED node comprising an LED lighting fixture comprising one or more light emitting diodes configured to illuminate a space and a lighting control apparatus comprising:
   a presence sensor to sense a presence of an object and to provide responsive output;
   an aggregator module configured to generate an aggregate presence value based on aggregate output of the presence sensor captured over a period of time; and
   an output module to generate lighting instructions based on the aggregate presence value,
   wherein the lighting instructions are configured to cause the one or more light emitting diodes (LEDs) of the LED lighting fixture to emit a coded light signal encoded into the emitted light that carries information indicative of the aggregate presence value or emit light having a hue selected to convey the aggregate presence value.

2. The LED node of claim 1, wherein the coded light signal further carries a timestamp.

3. The LED node of claim 1, wherein the aggregator module includes a capacitor that is charged while the presence sensor senses an object present, wherein a charge of the capacitor at a given time is representative of the aggregate presence value at that time.

4. The LED node of claim 3, wherein the aggregator module includes a resistor-capacitor (RC) circuit that controls a rate at which the capacitor is charged.

5. The LED node of claim 3, wherein the capacitor is discharged while the presence sensor does not sense an object present.

6. The LED node of claim 5, wherein the aggregator module includes a resistor-capacitor (RC) circuit that controls a rate at which the capacitor is discharged.

7. The LED node of claim 4, wherein one or more resistors in the RC circuit are adjustable to alter a charge rate of the capacitor.

8. The LED node of claim 1, further comprising a memory configured to store a counter, wherein the aggregator module is configured to increment the counter based on the responsive output of the presence sensor.

9. The LED node of claim 1, further comprising a coded light sensor to receive coded light signals.

10. The LED node of claim 9, wherein the output module is further configured to generate the lighting instructions in response to an instruction carried by a coded light signal received at the coded light sensor.

11. The LED node of claim 9, wherein the aggregator module is further configured to reset the aggregate presence value in response to an instruction carried by a coded light signal received at the coded light sensor.

12. The LED node of claim 1, wherein the aggregator module includes a filter to limit an amount of responsive output of the presence sensor that is captured to generate the aggregate presence value.

13. The LED node of claim 1, wherein the output module is further configured to generate the lighting instructions just prior to the one or more LEDs being turned off.

14. The LED node of claim 1, wherein the aggregator module is configured to count two or more instances of responsive output of the presence sensor within a predetermined time interval as a single instance of responsive output for purposes of generation of the aggregate presence value.

15. At least one non-transitory computer-readable medium comprising instructions that, in response to execution of the instructions by a computing device, cause the computing device to:

receive, via a light sensor, coded light emitted from a light emitting diode (LED) node, where the coded light is encoded into the emitted light;

demodulate the coded light emitted from the LED node to determine an aggregate presence value carried by the coded light signal that represents aggregate presence detected by the LED node over a period of time;

render, on a display, output indicative of the determined aggregate presence value.

16. The at least one non-transitory computer-readable medium of claim 15, wherein the output comprises a graphical indicator overlaying a rendition of the LED node on the display, the graphical indicator having a visual characteristic representative of the aggregate presence value.

17. A method of providing aggregate presence information, comprising:

sensing, by a light emitting diode (LED) node, presence of one or more objects;

generating, by the LED node based on the sensing over a period of time, an aggregate presence value, wherein said generating step comprises:

charging, by the LED node, a capacitor while presence of one or more objects is sensed over a period of time; and discharging, by the LED node, the capacitor while no presence is sensed over a period of time; and selectively illuminating, by the LED node based on a charge of the capacitor, one or more LEDs of an LED lighting fixture to convey the aggregate presence value represented by the charge using a hue or saturation of the emitted light or a coded light signal, said one or more LEDs being configured to illuminate a space.

18. The method of claim 17, wherein the selective illuminating comprises causing the one or more LEDs to emit the coded light signal encoded into the emitted light that carries information indicative of the aggregate presence value.

19. The method of claim 17, further comprising receiving, by the LED node in the coded light signal, an instruction to perform the selective illumination.

* * * * *